United States Patent [19]

Stevens

[11] 3,984,042

[45] Oct. 5, 1976

[54] MANUFACTURE OF FORKS FOR FORK LIFT TRUCKS

[75] Inventor: Godfrey Alfred Stevens, Leighton Buzzard, England

[73] Assignee: Lancer Boss Limited, Leighton Buzzard, England

[22] Filed: June 24, 1974

[21] Appl. No.: 482,489

[30] Foreign Application Priority Data

July 17, 1973 United Kingdom ............... 34055/73

[52] U.S. Cl. .................................. 228/170; 29/415

[51] Int. Cl.$^2$ ........................................ B23K 31/02

[58] Field of Search ............ 29/412, 415, 416, 475, 29/484; 37/120; 172/766; 171/105, 107; 113/1 M, 116 W; 228/170

[56] References Cited

UNITED STATES PATENTS

| | | | |
|---|---|---|---|
| 845,700 | 2/1907 | Miner et al. | 37/120 |
| 1,065,748 | 6/1913 | Vollers | 37/120 |
| 1,888,835 | 11/1932 | Ragan | 29/412 |
| 2,380,628 | 7/1945 | Zempel | 29/416 |

*Primary Examiner*—Al Lawrence Smith
*Assistant Examiner*—Robert C. Watson
*Attorney, Agent, or Firm*—Karl W. Flocks

[57] ABSTRACT

A method of producing fork lift truck forks of substantially L-shaped construction with substantially vertical and horizontal arm portions extending from the bend, comprising removing from a steel plate of a thickness corresponding to the width of the forks, a fork element shaped to a first of said arms with the bend and a portion of the second of said arms, and welding to said portion a strip of metal of substantially the width of said second arm to complete the second arm.

7 Claims, 2 Drawing Figures

MANUFACTURE OF FORKS FOR FORK LIFT TRUCKS

BACKGROUND OF THE INVENTION

1. Field of the Invention

This invention relates to the manufacture of forks, for use in fork lift trucks, and of like members from rolled steel sections.

2. Description of the Prior Art

Forks for fork lift trucks comprise two arms disposed substantially at right angles to one another, one arm having a tapered end portion for engagement under loads to be lifted and the other arm having a hook for engagement over a support member on the fork carriage riding on the mast of a fork lift truck.

Such forks have hitherto been made from rolled steel solid sections or strip. The taper is formed on one end portion of the section or strip as by forging and then the section or strip is bent about its mid portion by conventional bending methods. This bending is normally effected by drop forging and then the forks thus formed are subjected to heat treatment for example in a rotary furnace to provide the forks, especially at the angle, to the degree of hardness desired. Such methods have the disadvantage that they take a long time and require the expertise of forge-masters which results in a high cost of production. Also the crystalline structure of the section or strip tends to change during the bending and thus does not have the optimum crystalline condition.

It has been proposed to bull weld two arm sections together at right angles but this necessitates disposing the arm ends at right angles with one shaped arm end almost abutting the side of the second arm with a small gap e.g. 2 mm between them. The shaped end of the first arm has cutaway portions and these cutaway portions form, with the second arm, cavities into which weld metal is welded. This method is slow and the free end of the second arm adjacent the weld has to be ground or otherwise mechanically shaped to form a satisfactory smooth surface at the outside angle of the bend formed at the welded joint while the inside angle must be rounded with weld metal. This has proved to be expensive and time consuming and the necessary crystalline condition of the metal at the bend may have to be provided by heat treatment.

The main object of the present invention is to provide an improved process for the production of such forks in which the aforesaid disadvantages are reduced to an acceptable minimum.

SUMMARY

According to the present invention a method of producing fork lift truck forks of substantially L-shaped construction with substantially vertical and horizontal arm portions extending from the bend, comprises removing from a metal plate of a thickness corresponding to the width of the forks, a fork element shaped to a first of said arms with the bend and a portion of the second of said arms, and welding to said portion a strip of metal of substantially the width of said second arm to complete the second arm.

The removal of the fork element from the plate may be carried out with a cutting tool such as a punching tool, a saw or other suitable means such as oxy-acetylene cutting flame jet or jets.

The second arm portion of the fork element may be substantially six to twelve inches in length from the central portion of the bend. The strip of metal is preferably the same metal as the fork element, and may be removed from the same plate as the fork element. The plate may be of any metal having the required characteristics of tensile strength, crystalline structure and hardness, steel being preferred. The welding operation aforesaid is preferably by flash or butt welding, or by the method described in our copending application Ser. No. 482,490.

In a preferred construction of forming forks for fork lift trucks which are 4 inches wide on the load carrying arms of the forks, and a thickness or depth of 2 inches the plate is 4 inches thick and the portion removed has a width of 2 inches equal to the thickness or depth of the fork arm required. Since one arm, i.e. the horizontal load bearing arm, of a fork is normally tapered towards its free end this taper may be formed in removing the fork element from the plate or the element removed may be 2 inches wide throughout its length and subsequently tapered by suitable means such as by forging, milling or cutting.

DESCRIPTION OF PREFERRED EMBODIMENT

Figure 1:
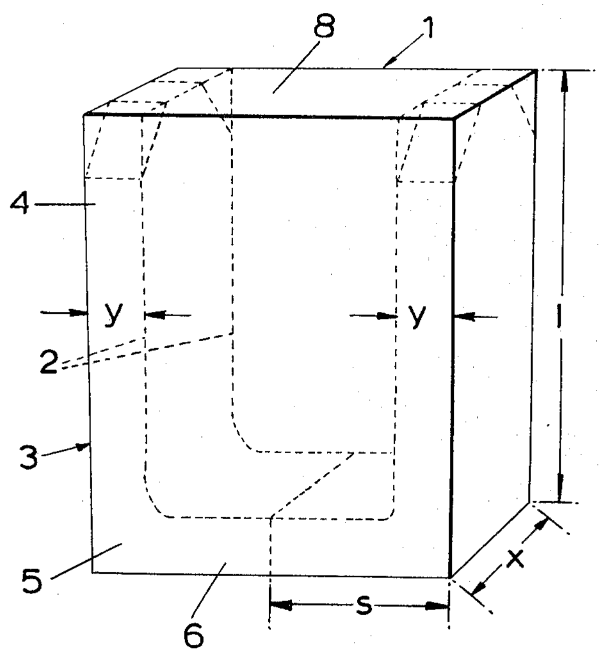
FIG. 1 shows a sheet of steel showing how two fork elements may be produced therefrom; and, FIG. 2 shows one fork in the course of production using one of the fork elements produced in FIG. 1.

Referring to the drawings FIG. 1 shows a steel plate 1 of a thickness $x$ equal to the width of the arms of a fork for use in a fork lift truck.

By using an appropriate tool, such as a punching tool, or tools, a saw or saws, or an oxy-acetylene cutting flame jet or jets, along the line 2, a fork element 3 is removed from the plate. This element has a first arm 4 of the fork, a bend portion 5 and a short length 6 forming the root portion of the second arm of a fork. The dimension $y$ is selected for the line 2 of the removal so that the element has the thickness $y$ equal to the thickness of the fork arms.

The fork element 4, 5, 6 is shown removed obliquely from a rectangular plate, but it may be removed from any part of the plate. By removing the element as in FIG. 1 the minimum of severing lines 2 is used, but the manner of removal is chosen to make use of the maximum account of the metal of the plate 1.

Figure 2:
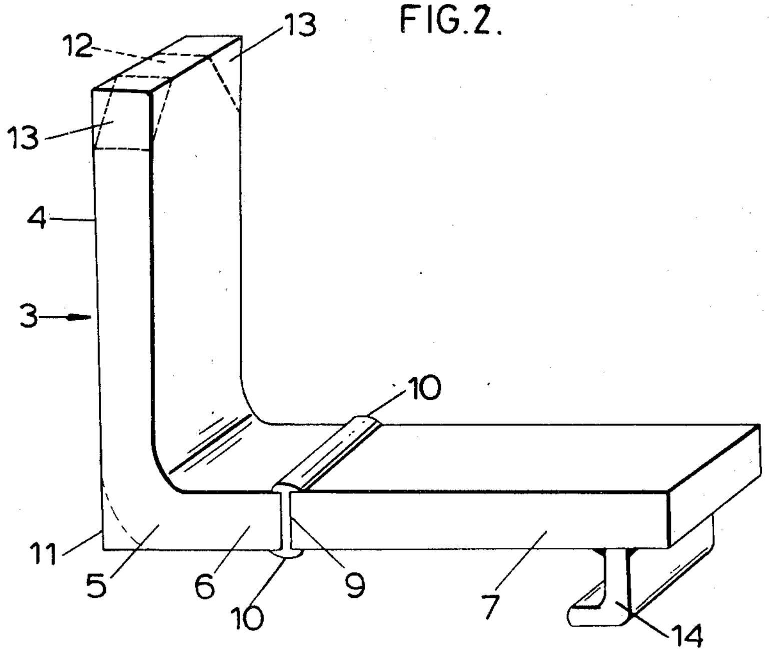

After removal of the element 3, a metal strip 7, which may be removed from the residual metal 8 of the plate 1, is provided having the dimensions $x$ and $y$ as for the element 3. The strip 7 is then disposed in prolongation of the arm 6 as seen in FIG. 2 and welded thereto in any known manner shown in FIG. 2 by a weld, 9. This may be machined or otherwise treated to move one or both the flashes 10 of the weld. The metal at the outer angle 11 of the bend 5 is subsequently removed in any known manner as by grinding, milling or cutting. The free end 12 of the arm 4 forming preferably the horizontal arm of the fork in use may be tapered by removal of the metal 13 by suitable means after removal from the plate 1 or it may be shaped by using the tools when removing the element 3 from the plate 1.

The strip 7 may be removed from the spare metal 8 or provided from a different source of supply.

The strip 7 may have secured to it, or integral with it when cutting it from the plate 1 or other source, a hook 14 for mounting the fork on the carriage of a fork lift truck mast.

As seen in FIG. 1, two fork elements 3 are removed from the plate 1, but any other lines of cutting from a metal plate may be used so as to minimise the wastage of metal.

By the invention the characteristics of the metal of the plate such as hardness and crystalline condition are retained in the forks produced since no bending of the strip is necessary, but they may also be heat treated or otherwise treated to produce or enhance these characteristics.

I claim:

1. A method of producing fork lift truck forks of substantially L-shaped construction with substantially vertical and horizontal arm portions meeting at a bend, said method comprising removing from a metal plate, of a thickness corresponding to the width of the forks and having strength characteristics required in a fork particularly at the bend, an L-shaped fork element having one of said arms with said bend portion and also having a portion of the second of said arms, and welding to said portion of the second of said arms a strip of metal substantially the width of said second arm to complete the length of said second arm.

2. A method according to claim 1 wherein said fork element is removed from said plate by cutting with a punching tool.

3. A method according to claim 1 wherein said fork element is removed from said plate by cutting with a saw.

4. A method according to claim 1 wherein said fork element is removed from said plate by cutting with at least one oxyacetylene cutting flame jet.

5. A method according to claim 1 wherein said portion of said second arm portion of said fork element extends from said bend for distance between six and twelve inches.

6. A method according to claim 1 wherein said metal strip is removed from the waste portions of said plate after said fork elements have been removed from said plate.

7. A fork for a fork lift truck produced in accordance with the method of claim 1.

* * * * *